(12) United States Patent
Kannan et al.

(10) Patent No.: US 8,935,619 B2
(45) Date of Patent: Jan. 13, 2015

(54) SLIDER AND HISTORY FIELD FOR SMART CHAT SESSIONS

(75) Inventors: Pallipuram V. Kannan, Los Gatos, CA (US); Mohit Jain, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 875 days.

(21) Appl. No.: 13/107,655

(22) Filed: May 13, 2011

(65) Prior Publication Data

US 2012/0023419 A1    Jan. 26, 2012

Related U.S. Application Data

(60) Provisional application No. 61/366,843, filed on Jul. 22, 2010.

(51) Int. Cl.
*G06F 3/00* (2006.01)
*G06Q 10/10* (2012.01)
*G06F 3/0481* (2013.01)
*G06F 3/0488* (2013.01)

(52) U.S. Cl.
CPC ............ *G06Q 10/107* (2013.01); *G06F 3/0488* (2013.01); *G06F 3/0481* (2013.01)
USPC .......................................... 715/758; 715/790

(58) Field of Classification Search
CPC ............................. G06F 3/0481; G06F 3/0488
USPC ................................................. 715/758, 790
See application file for complete search history.

(56) References Cited

U.S. PATENT DOCUMENTS

| | | | |
|---|---|---|---|
| 6,727,916 B1 | 4/2004 | Ballard | |
| 6,999,990 B1* | 2/2006 | Sullivan et al. | 709/205 |
| 2002/0095462 A1 | 7/2002 | Beck et al. | |
| 2005/0102358 A1 | 5/2005 | Gold et al. | |
| 2005/0132298 A1* | 6/2005 | Lueckhoff et al. | 715/758 |
| 2006/0165066 A1* | 7/2006 | Campbell et al. | 370/352 |
| 2007/0220441 A1* | 9/2007 | Melton et al. | 715/781 |
| 2007/0245249 A1 | 10/2007 | Weisberg | |
| 2008/0034309 A1* | 2/2008 | Louch et al. | 715/766 |
| 2008/0126949 A1* | 5/2008 | Sharma | 715/751 |
| 2008/0177600 A1* | 7/2008 | McCarthy et al. | 705/7 |
| 2009/0254840 A1* | 10/2009 | Churchill et al. | 715/753 |
| 2009/0282421 A1* | 11/2009 | Jaffer et al. | 719/317 |
| 2010/0287494 A1* | 11/2010 | Ording | 715/790 |

* cited by examiner

*Primary Examiner* — Tuyetlien Tran
(74) *Attorney, Agent, or Firm* — Michael A. Glenn; Perkins Coie LLP (57) ABSTRACT

A context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. A history section is provided with which the visitor can track back all previous steps carried out within the smart client. A history bar provides an iconic representation of all previous activities. A technique is also disclosed for executing various actions, such as form filling or requests for additional services, in a chat session.

18 Claims, 14 Drawing Sheets

SLIDER AND HISTORY FIELD FOR SMART CHAT SESSIONS

CROSS REFERENCE TO RELATED APPLICATIONS

This application claims priority to provisional U.S. patent application Ser. No. 61/366,843, filed Jul. 22, 2010, which application is incorporated herein in its entirety by this reference thereto.

BACKGROUND OF THE INVENTION

1. Technical Field

The invention relates to on-line customer service. More particularly, the invention relates to a slider and history field for a smart chat session.

2. Description of the Background Art

Online chat can refer to any kind of communication over the Internet, but is primarily meant to refer to direct one-on-one chat or text-based group chat (formally also known as synchronous conferencing), using tools such as instant messengers, Internet Relay Chat, talkers, and possibly MUDs. The expression online chat comes from the word chat which means "informal conversation."

Figure 1:
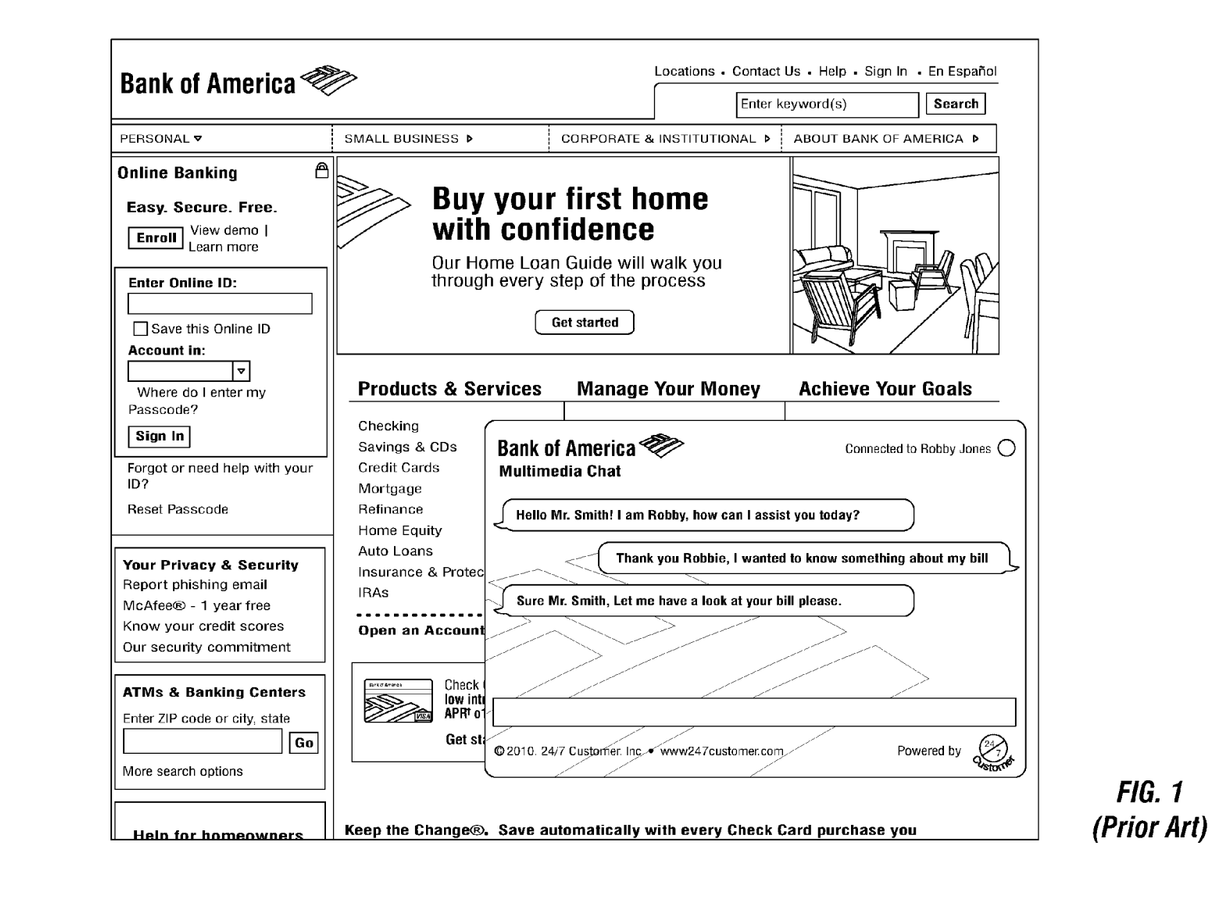
FIG. 1 is a screen shot showing a chat session on a conventional PC display.
Figure 2:
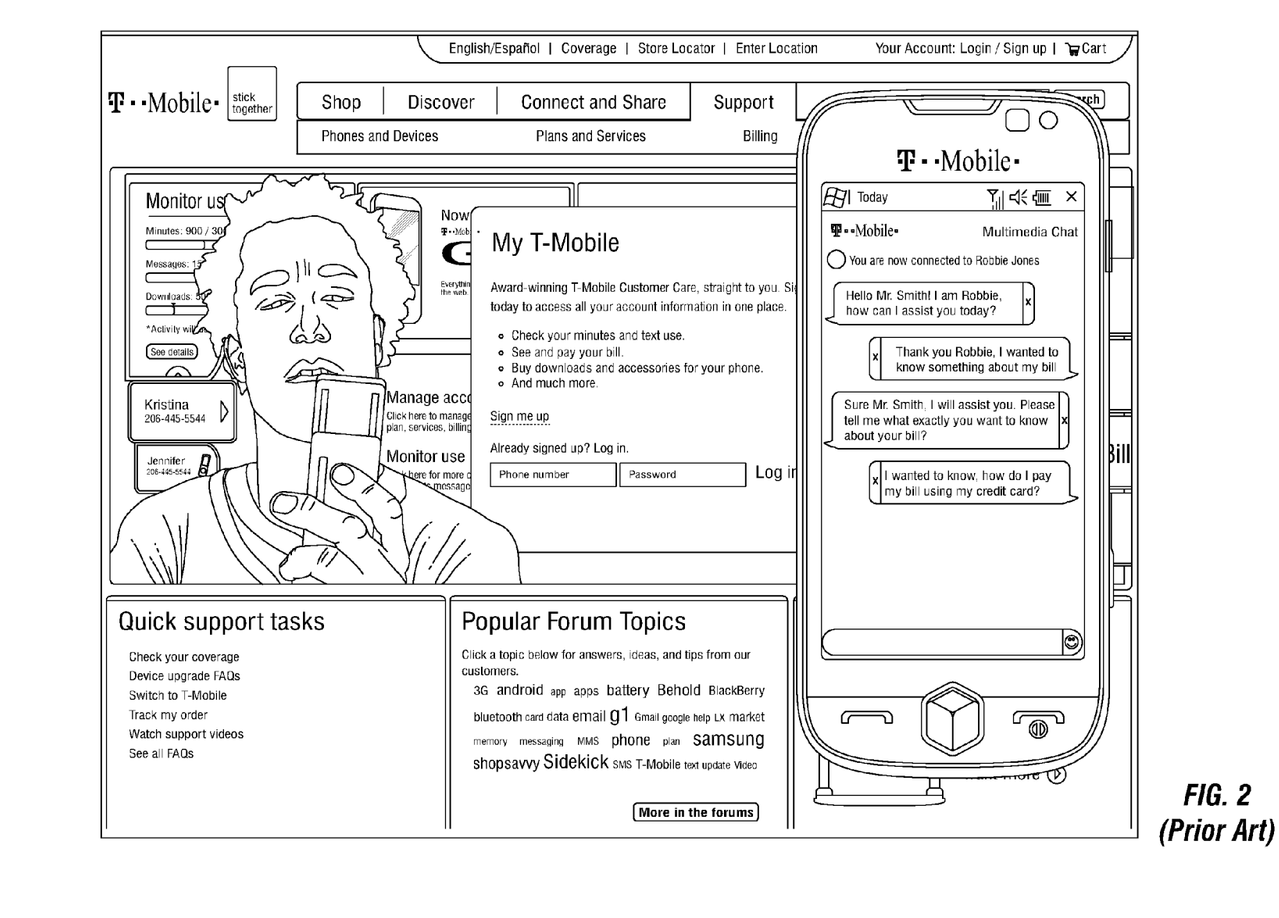
FIG. 2 is a screen shot showing a chat session on a conventional smart phone display.

Currently, a visitor to an on-line service can engage in a chat session pursuant to such visit. For example, FIG. 1 is a screen shot showing a chat session on a conventional PC display; and FIG. 2 is a screen shot showing a chat session on a conventional smart phone display. Unfortunately, a chat session is confined to the immediate chat window and thus limits the types of interaction available as part of the chat. This problem is especially pronounced in a device having a small display, such as that of the smart phone shown in FIG. 2.

A further problem arises in tracking a chat session flow, for example during a series of steps in a procedure, where a visitor or agent might want to refer back to a specific action.

Finally, there is no method for executing various actions, such as form filling or requests for additional services, in a chat session other than during the actual chat dialog.

It would be advantageous to provide improvements in chat session technology that address the above problems in conventional chat techniques.

SUMMARY OF THE INVENTION

In an embodiment of the invention, a context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. While the chat agent is interacting with the visitor, the agent can trigger the slide area, via an agent console, as and when information and/or forms are to be sent to the visitor.

An embodiment of the invention includes a history section with which the visitor can track back all previous steps carried out within the smart client. A history bar provides an iconic representation of all previous activities.

A further embodiment of the invention provides a technique for executing various actions, such as form filling or requests for additional services, in a chat session.

DETAILED DESCRIPTION OF THE INVENTION

In an embodiment of the invention, a context sensitive slider content area provides a slide out mechanism that is automatically actuated when additional information is needed during a chat session between an agent and a visitor, e.g. where a pre-chat and/or exit form is to be completed. The context sensitive slide out content area also provides problem resolution information to the visitor to help in solving problems, e.g. the top five problems; and also provides a self-service step-by-step wizard. While the chat agent is interacting with the visitor, the agent can trigger the slide area, via an agent console, as and when information and/or forms are to be sent to the visitor.

An embodiment of the invention includes a history section with which the visitor can track back all previous steps carried out within the smart client. A history bar provides an iconic representation of all previous activities.

A further embodiment of the invention provides a technique for executing various actions, such as form filling or requests for additional services, in a chat session.

Figure 3A:
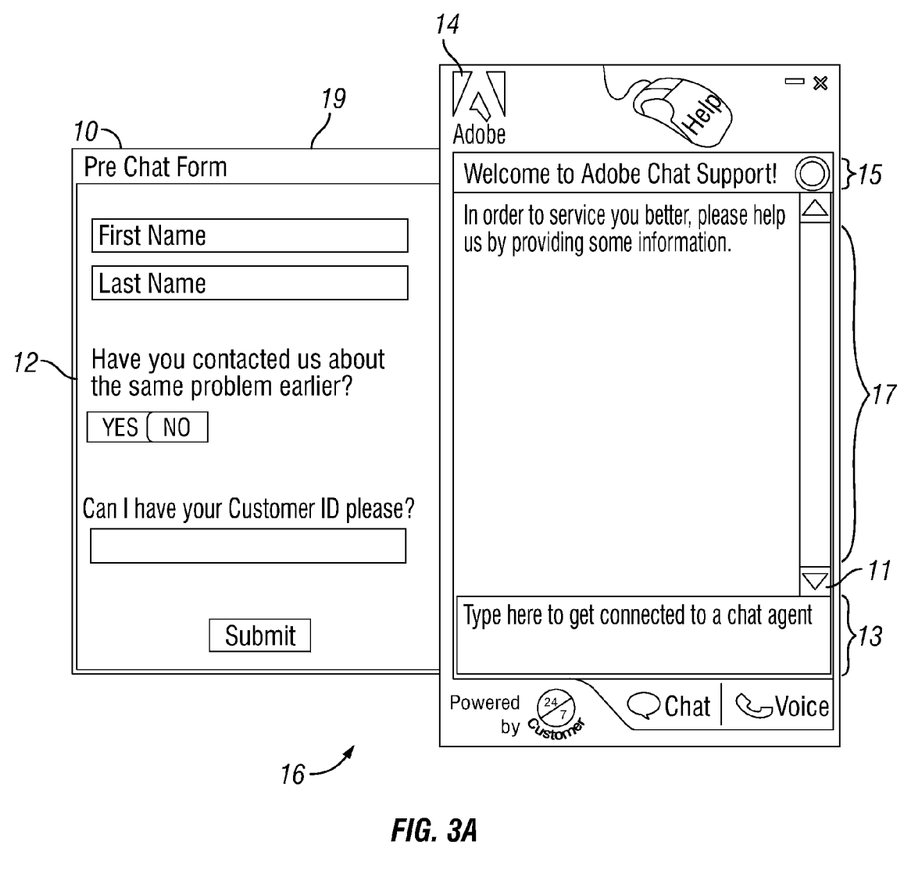
FIGS. 3A and 3B are schematic diagrams showing the layout of a smart client wizard according to the invention.
Figure 3B:
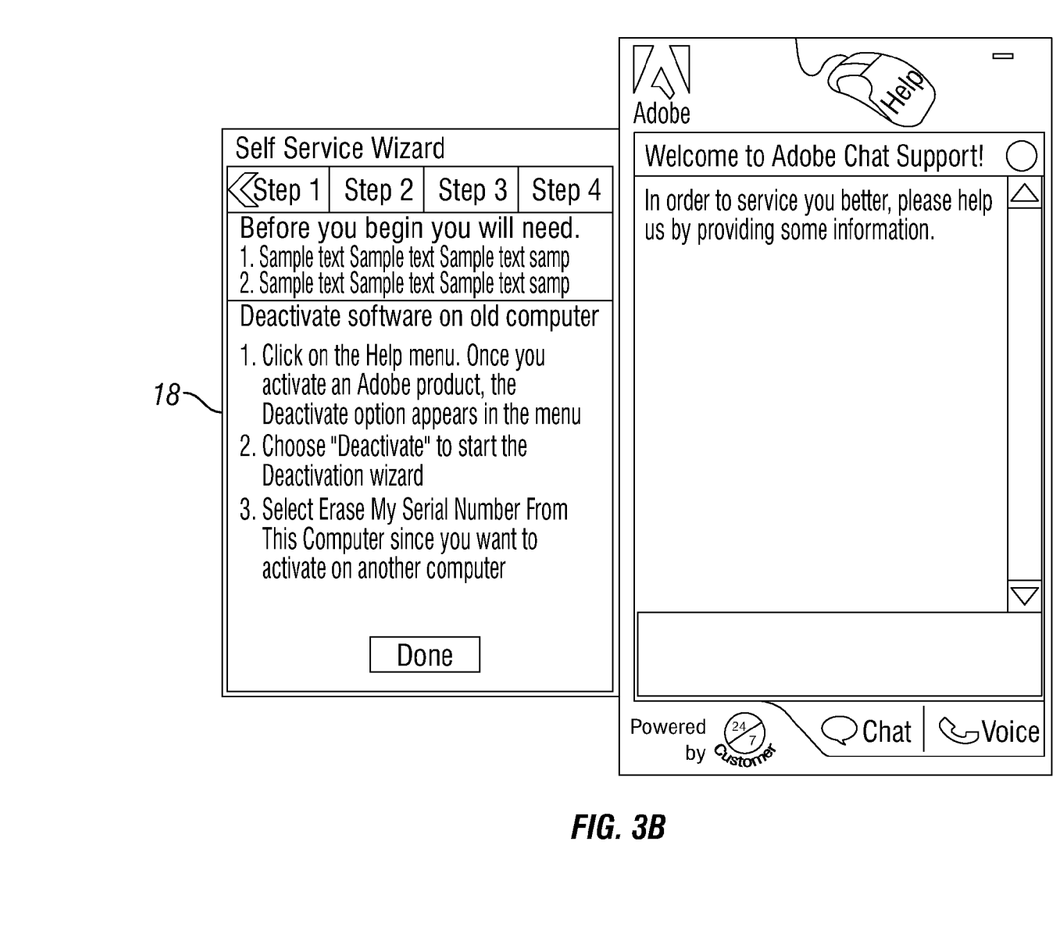

FIGS. 3A and 3B are schematic diagrams showing the layout of a smart client wizard according to the invention.

In FIG. 3A, a smart phone 16 is shown having a branding area 14 for displaying a client logo. An agent active button 15 shows the chat area status, i.e. connected or standing by. A widget content area 17 is provided that mentions all previous activities completed by the visitor. This can include a history section with which the visitor can track back all previous steps carried out within the smart client. A history bar 11 provides an iconic representation of all previous activities. A chat area 13 is provided in case the visitor is not interested in self service. Accordingly, the visitor can start directly typing into the chat area and is automatically connected to the chat queue.

A content sensitive pre-chat form 10, based on click stream data, provides relevant questions which, in turn, assist the agent in assisting the visitor. A context sensitive slider content area 12 provides a slide out mechanism that is automatically actuated when additional information is needed, e.g. where a pre-chat and/or exit form is to be completed. In FIG. 3A, a pre-chat form 19 is shown that the visitor completes before beginning a chat session.

The context sensitive slide out content area also provides problem resolution information to the visitor to help in solving problems, e.g. the top five problems; and also provides a self-service step-buy-step wizard. While the chat agent is interacting with the visitor, the agent can trigger the slide area, via an agent console, as and when information and/or forms are to be sent to the visitor.

In FIG. 3B, for example, the context sensitive slide out content area is shown providing a self service wizard 18.

Those skilled in the art will appreciate that any number of context sensitive slider content areas can be provided at any point in a visitor interaction with a customer service facility.

As discussed above, FIG. 1 is a screen shot showing a chat session on a conventional PC display; and FIG. 2 is a screen shot showing a chat session on a smart phone display. In each case, there is no facility for the agent and/or the visitor to side step the chart session screen itself to provide or receive additional information. In the example of FIG. 1, in accordance with an embodiment of the invention, the agent could slide out a copy of the visitor's bill and the agent and visitor could discuss the bill in the chat area, while at the same time viewing the bill. Likewise, in the example of FIG. 2, in accordance with an embodiment of the invention, the agent could slide out a copy of the bill paying procedures requested by the visitor, and the session could move between the chat area and the slide out area.

Figure 4A:
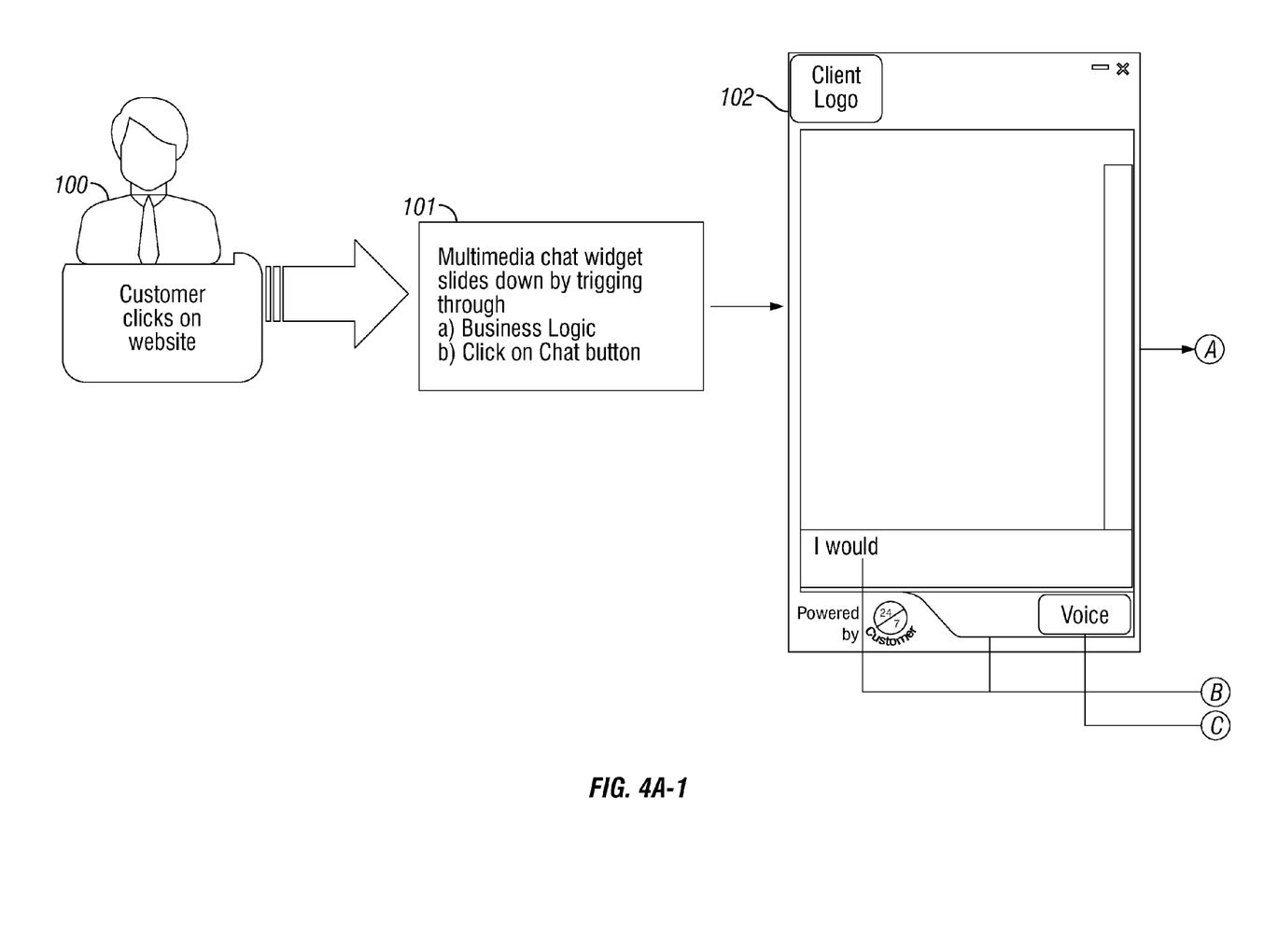
FIGS. 4A-4C are flow diagrams showing a process flow for a smart chat session according to the invention.
Figure 4A:
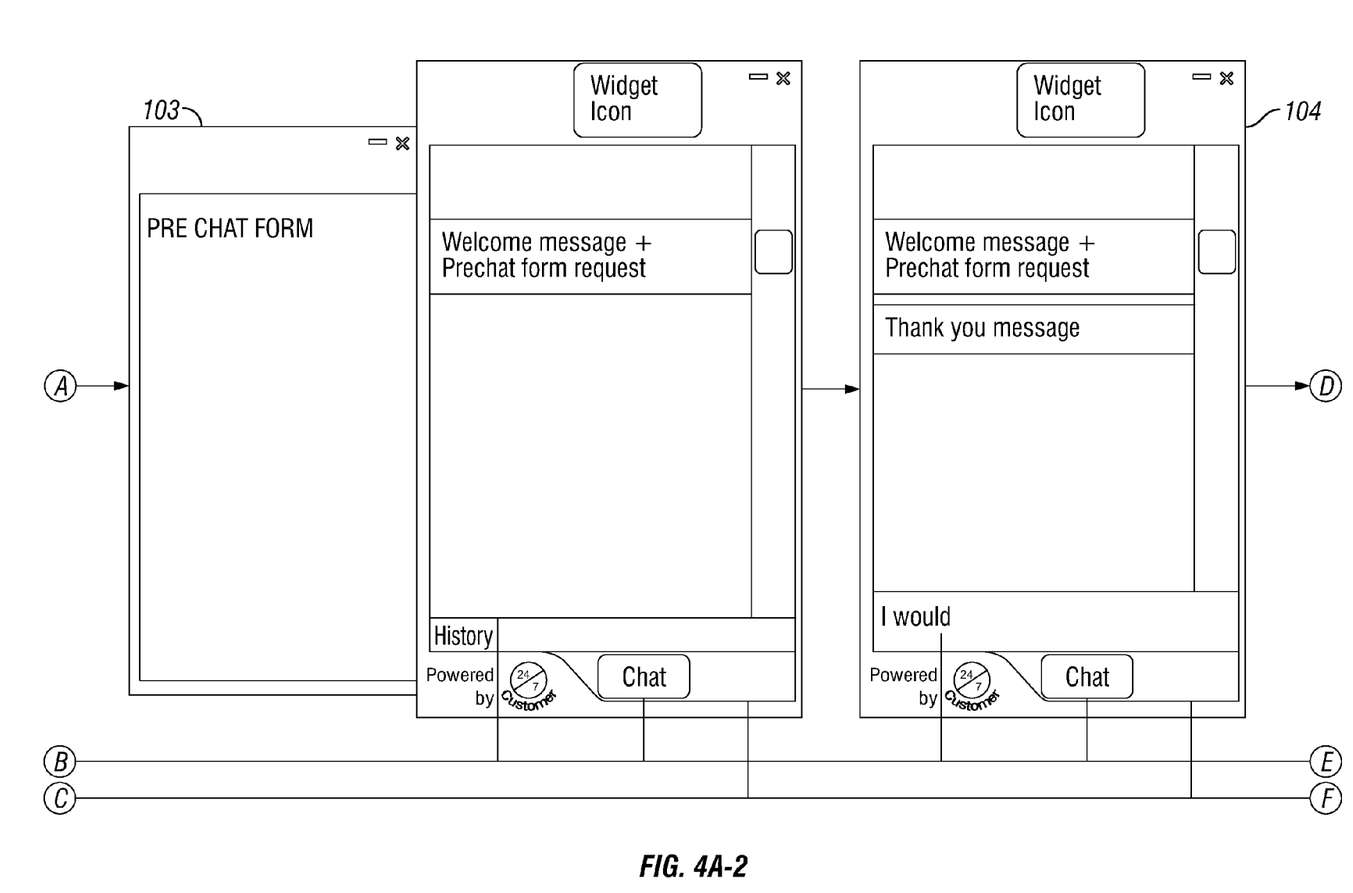
Figure 4B:
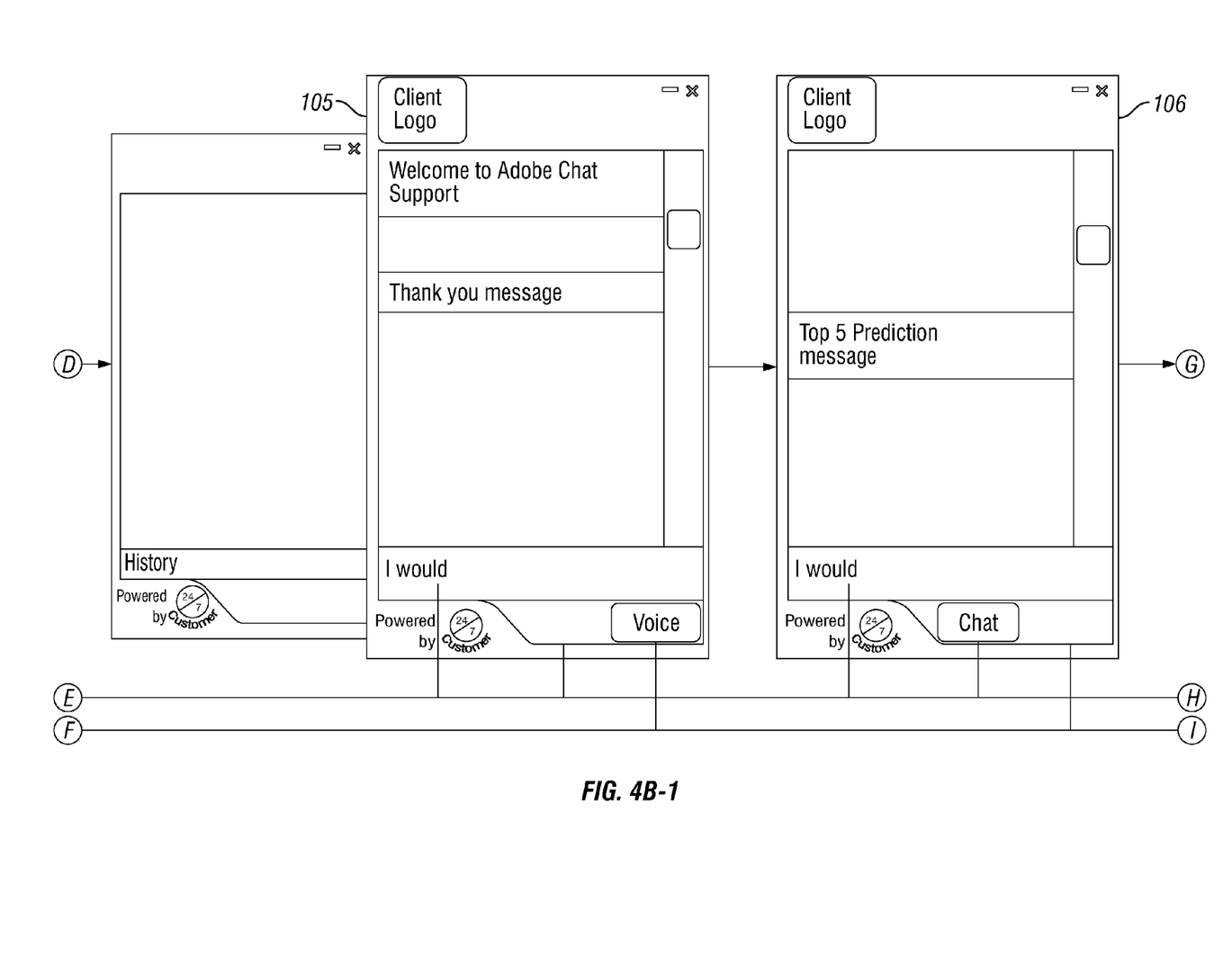
Figure 4B:
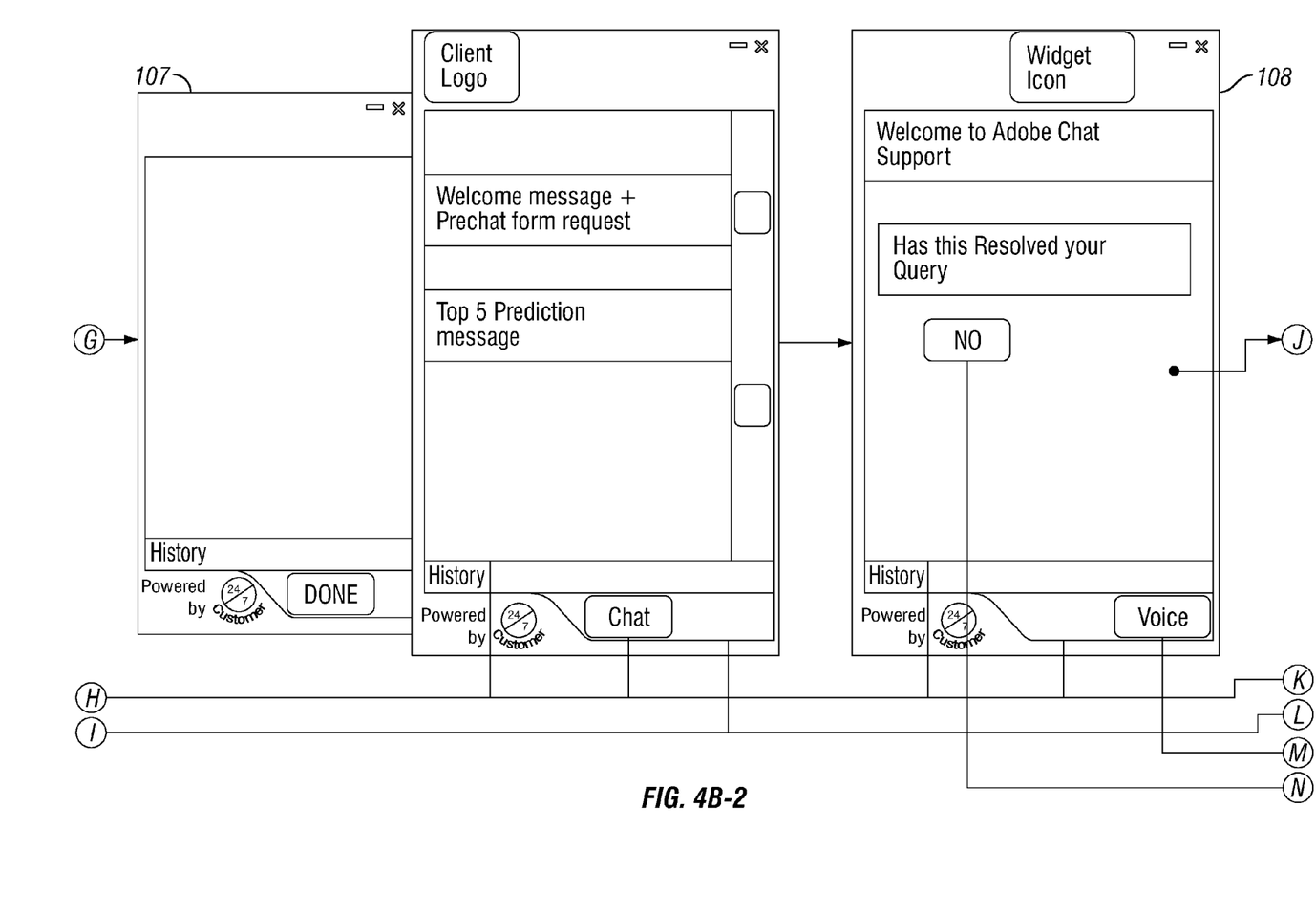
Figure 4C:
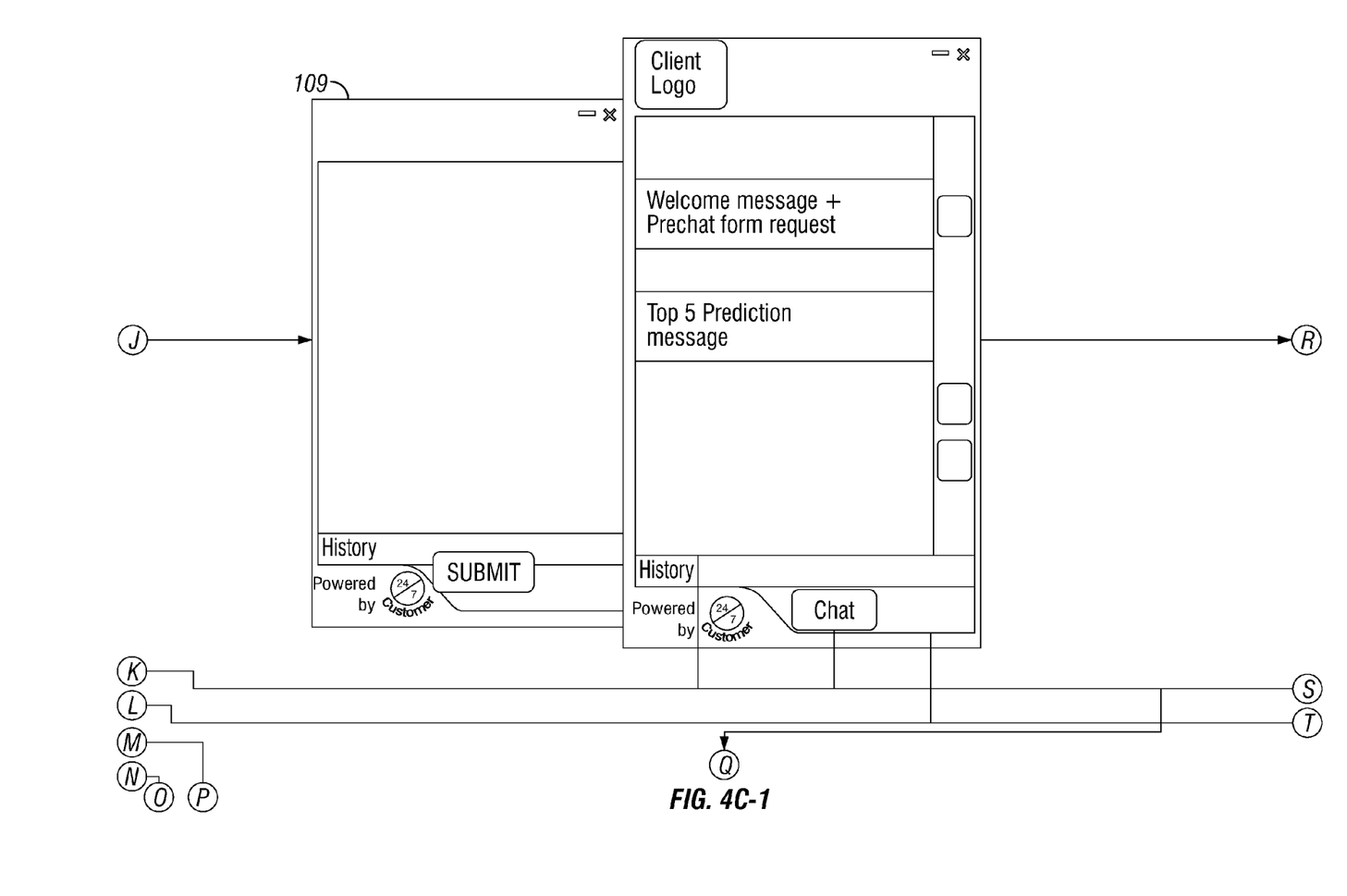
Figure 4C:
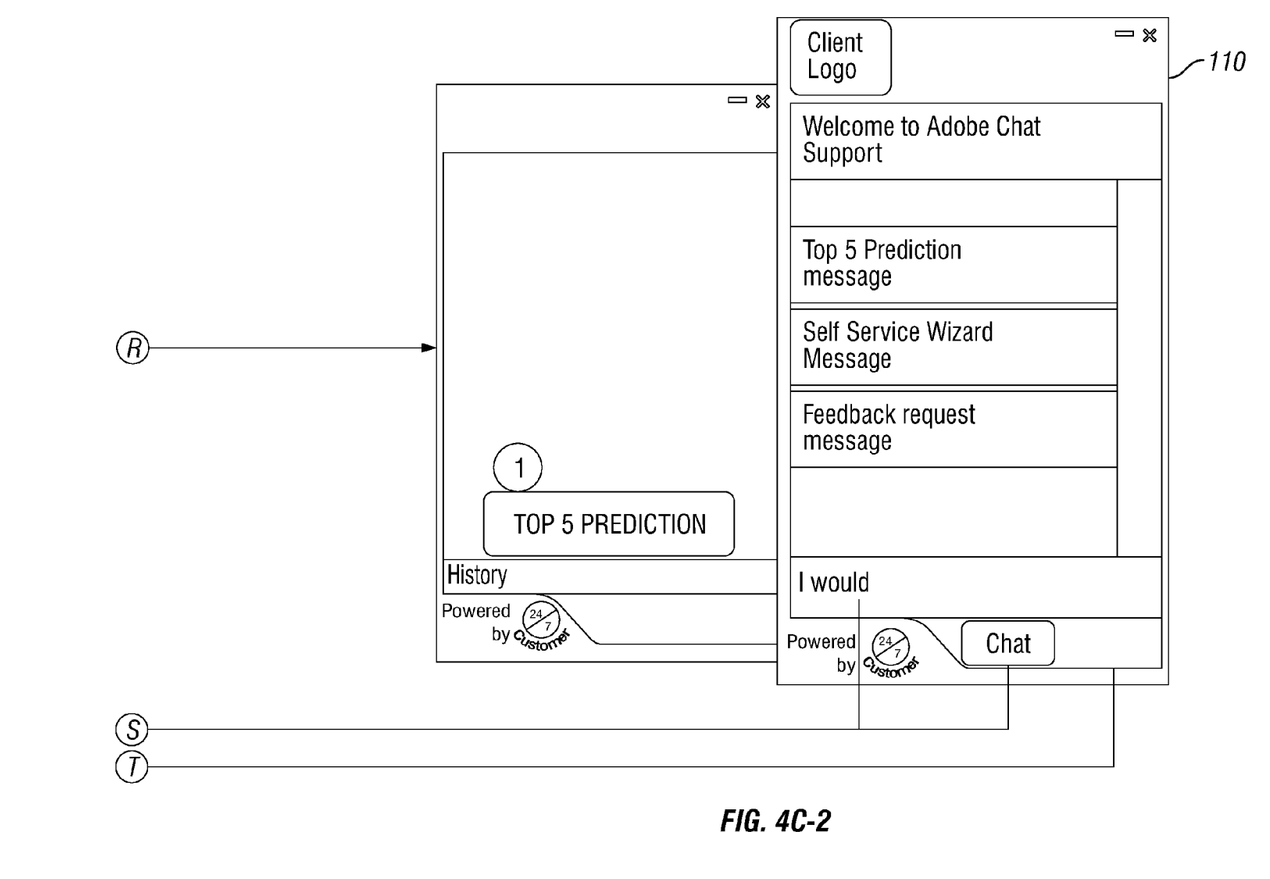
Figure 4C:
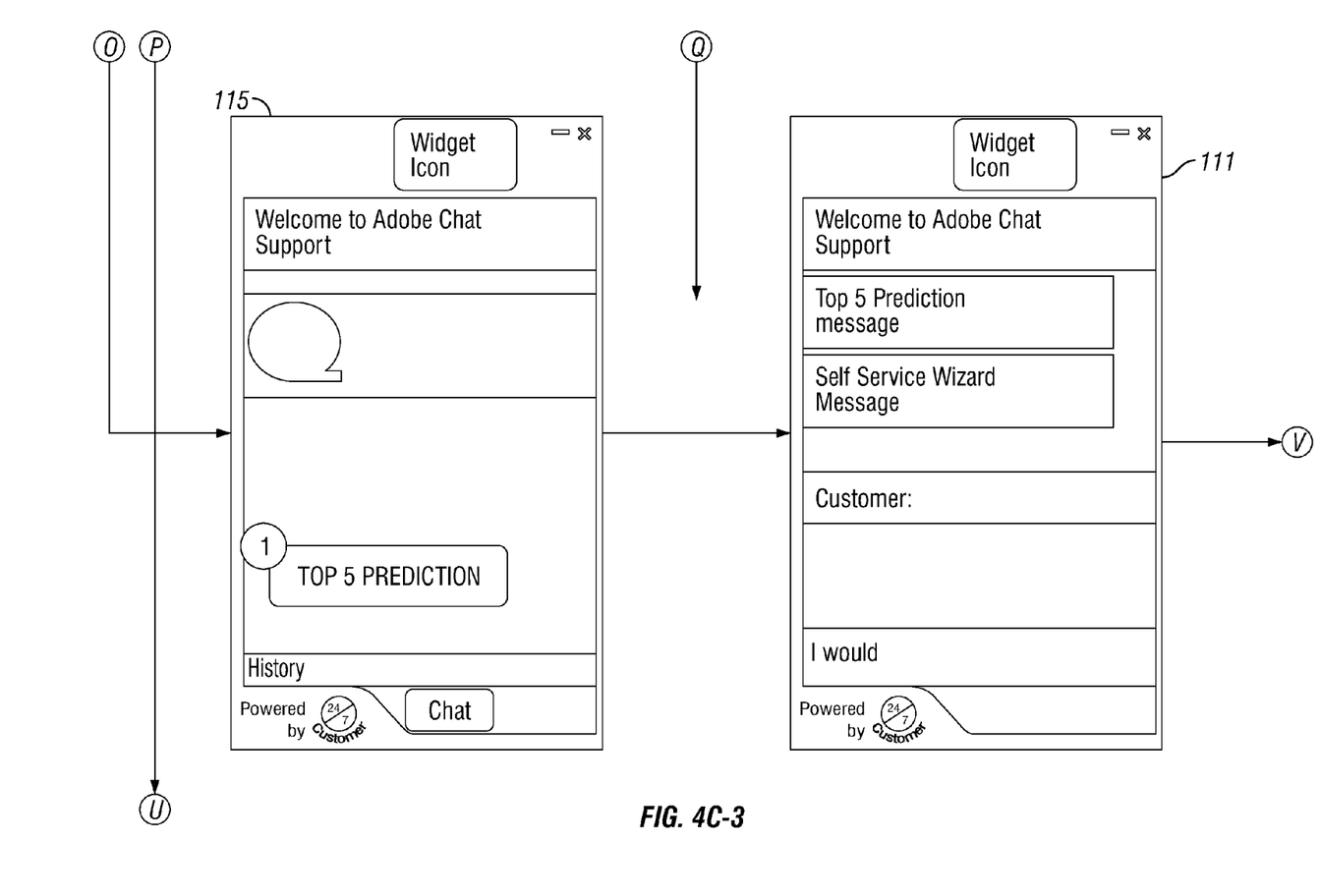
Figure 4C:
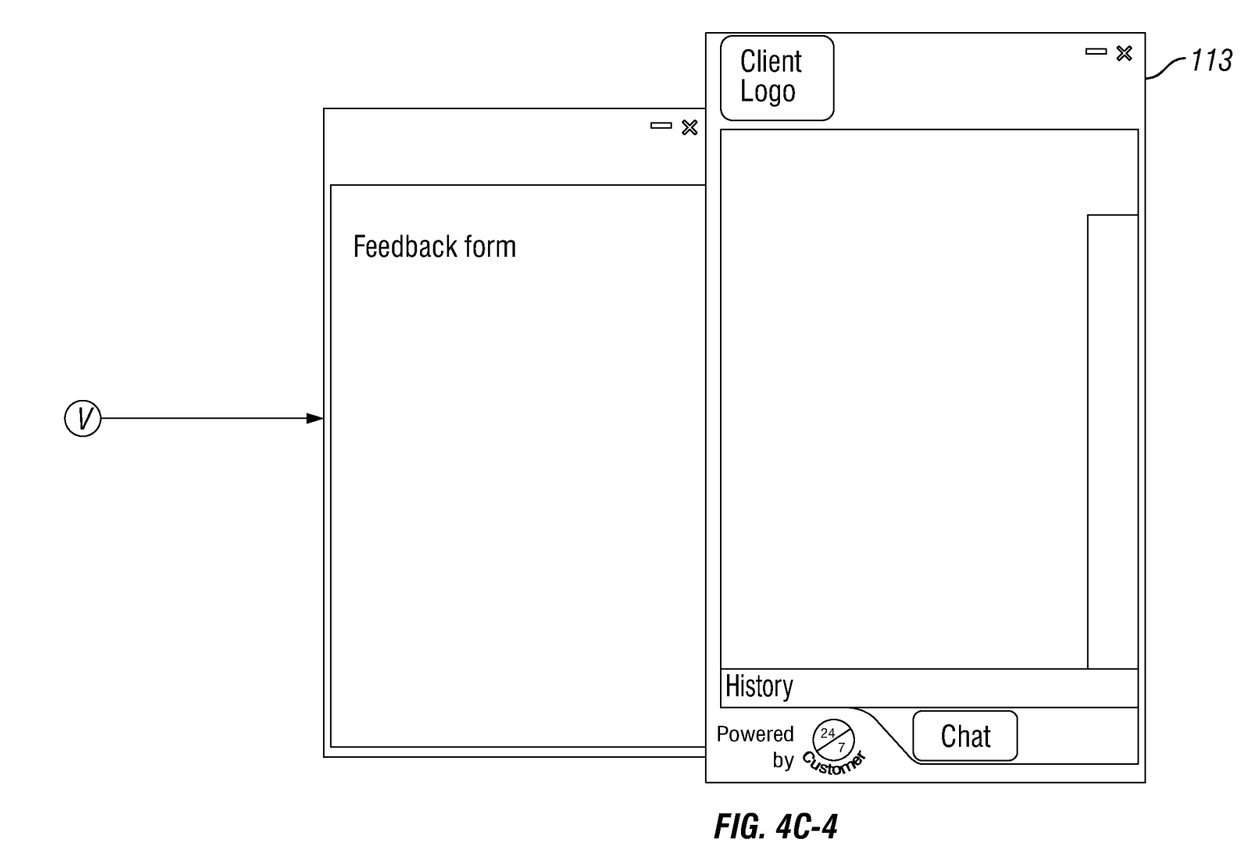
Figure 4C:
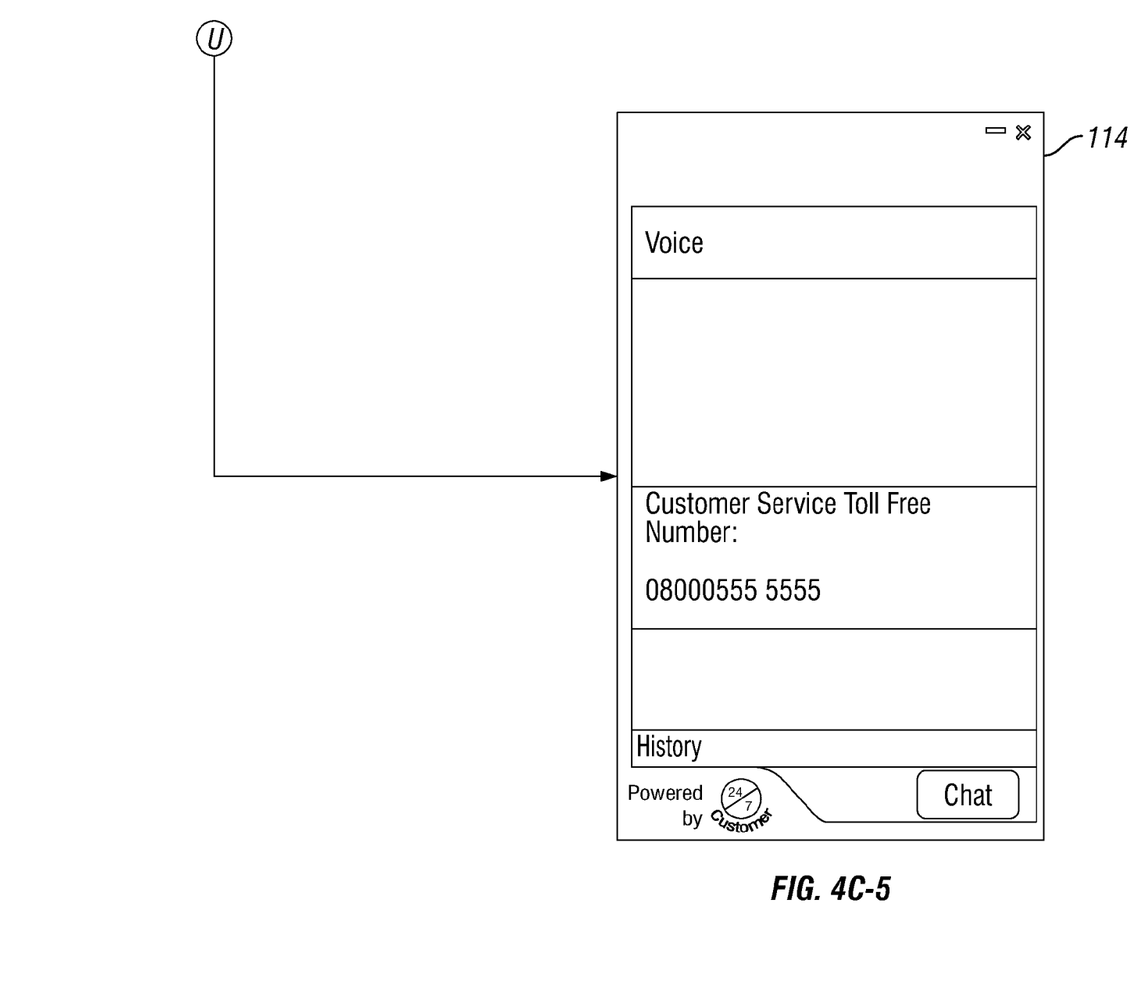

FIGS. 4A-4C are flow diagrams showing a process flow for a smart chat session according to the invention.

In FIG. 4A, a visitor (Customer) clicks on a website (100). A multimedia chat widget slides down and is displayed to the visitor (1010). The widget is triggered, for example, by business logic or by a click on chat button.

A welcome message is displayed and a pre-chat request form is presented to the visitor (102). At this point, the visitor can select a voice session (see FIG. 4C: 114). Otherwise, the pre-chat form is presented in the slide out area (103). At this point, the visitor can select a chat session (see FIG. 4C: 115). Otherwise, a submit button is provided in the pre-chat form and a pre-chat form icon appears in the history bar after the form has been submitted by the visitor. The pre-chat form is not mandatory in all embodiments of the invention.

A 'thank you' message is displayed to the visitor after the pre-chat form is submitted (104). The visitor can view the submitted form by clicking the icon in the history bar. Business logic generates and presents the visitor with a top five prediction message regarding the visitor request. Those skilled in the art will appreciate that any number of predictions can be included in the message. To chat, the visitor types a message in the message box, or the visitor can click on the chat button.

In FIG. 4B, the top five predictions are displayed in the slider to the visitor (105). At this point, the visitor can select a voice session (see FIG. 4C: 114). Otherwise, the prediction icon is also displayed in the history bar. To advance the session, the visitor clicks on a problem. At this point (106), the visitor can select a chat session (see FIG. 4C: 115). Otherwise, a self service message is displayed that requests the visitor to view the self service wizard.

The self service wizard is then displayed in the slider (107). At this point, the visitor can select a chat session (see FIG. 4C: 115). If the user proceeds with the self service wizard, the first part of the slide out contains the prerequisites which list out the information that the visitor needs to have handy. The second part of the slide out shows the steps. The steps to be followed in a tabbed interface having arrows at both ends. After the visitor is done, he submits the self service wizard, the self service icon display is then displayed in the history bar.

A resolution question is then displayed (108). The visitor is provided with a 'yes' and 'no' option with regard to resolution. At this point, the visitor can select a voice session (see FIG. 4C: 114).

In FIG. 4C, a feedback request message is displayed (109). A feedback form is displayed in the slider and a submit button is provided. After the feedback form is submitted, the feedback form icon is displayed in the history icon. At this point, the visitor can select a chat session 111.

A 'thank you' message is displayed in the slider (110). The visitor is provided with the option of viewing another prediction and a link to the top five predictions is provided. At this point, the visitor can select a chat session 111.

If a voice session is requested (see FIGS. 4A and 4B), a toll free number is displayed for contacting the company (114).

If a chat session is requested, as shown in FIGS. 4A and 4B, then the chat option is displayed to the visitor (115). An 'any other problem' message is also displayed in the slider and a top five predictions link is displayed.

Once a chat session is requested, the slide out is immediately closed and a pop up is provided for chat (111). The chat screen is typically presented using a familiar chat metaphor. However, the previous history is still reflected in the chat window.

After the chat conversation, the agent requests that the visitor fill out a feedback form (113). The feedback form is displayed in the slider, as well as a submit button. After the feedback has been submitted, the feedback icon is displayed on the history bar. If the visitor is not satisfied with the outcome of the session, the agent can suggest that the visitor click on the voice button to get a toll free number to call.

Computer Implementation

Figure 5:
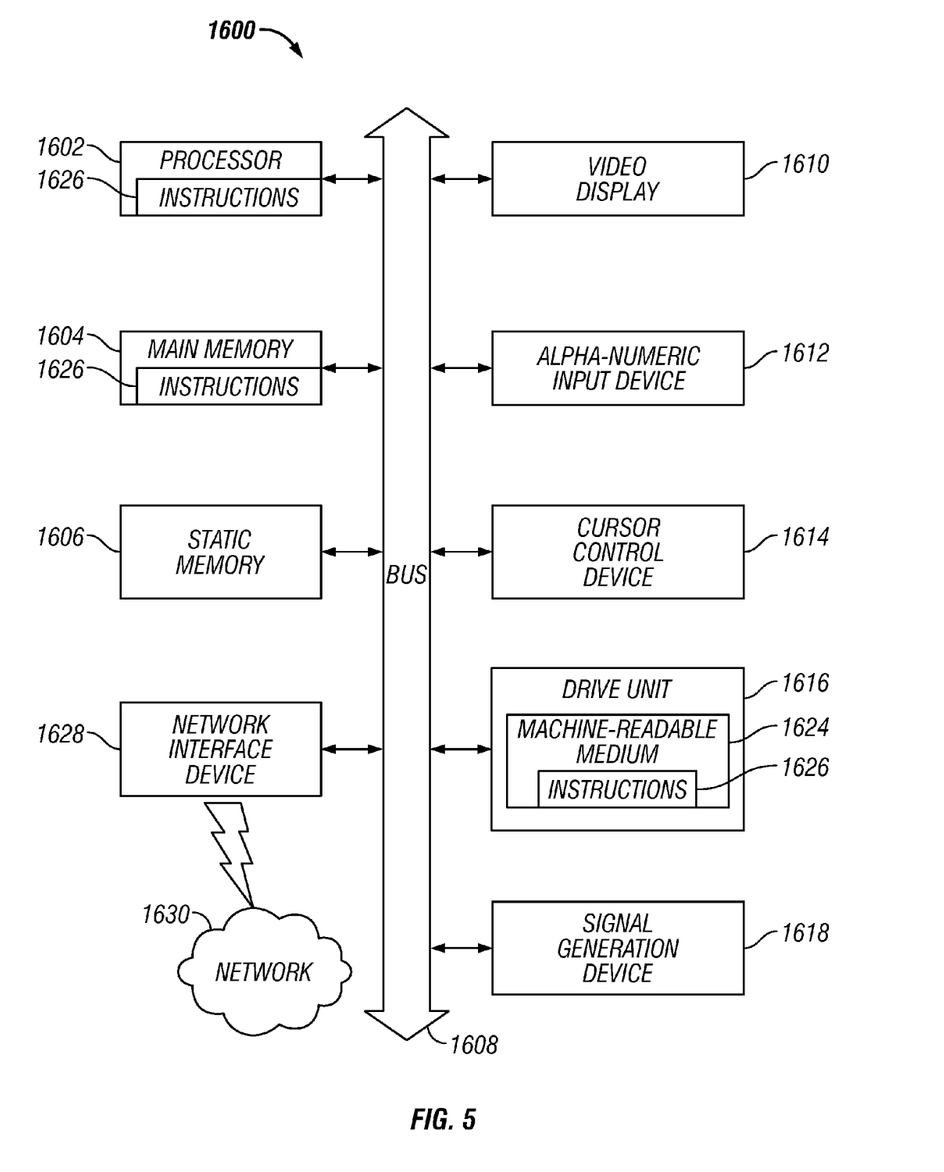
FIG. 5 is a block schematic diagram of a machine in the exemplary form of a computer system within which a set of instructions for causing the machine to perform any one of the foregoing methodologies may be executed.

FIG. 5 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
a processor, said processor implementing a chat client configured to provide a chat tool and chat content display area on a user device for user participation during a chat session held between said user and an agent; and
said processor implementing a context sensitive display area that is independent of, and configured to appear to slide out from and at least partially replace, said chat content display and to present additional information to said user when actuated during, and as part of, said chat session;
wherein said context sensitive display is automatically actuated based on user click stream data when additional information is needed;
wherein said context sensitive display provides relevant questions to the user, the user's answers to which provide said additional information to the agent to assist the agent in assisting the user;
wherein said chat content display area is configured to display a chat session history with which said user can track back all previous steps carried out with said chat client; and
wherein said chat session history comprising a history bar that provides an iconic representation of all previous user activities.

2. The apparatus of claim 1, said context sensitive display area comprising any of a pre-chat and/or exit form.

3. The apparatus of claim 1, said context sensitive display area comprising a context determined presentation of problem resolution information provided in response to user interaction with said chat client to help said user in solving specific problems.

4. The apparatus of claim 3, said problem resolution information comprising a listing of resolutions for two or more problems in response to user interaction with said chat client.

5. The apparatus of claim 1, said context sensitive display area comprising a self-service step-by-step wizard.

6. The apparatus of claim 1, wherein said context sensitive display area is configured to be triggered by said chat agent as appropriate while said chat agent is interacting with said user to provide information and/or forms to said user.

7. The apparatus of claim 1, said chat client configured for executing user actions other than an exchange of chat messages during a chat session.

8. A smart chat client implemented in a communications device having a display that is configured to provide a chat area, comprising:
a display comprising content area configured to provide an iconic representation of previous activities completed by a user of said device, wherein said content area is configured to display a chat session history with which said user can track back previous steps carried out with said chat client;
said display further comprising a chat area with which said user can be automatically connected to a chat queue, and into which said user can enter the user's side of a chat session and view an agent's side of said chat session; and
said display further comprising a context sensitive display area that is independent of, and configured to appear to slide out from and at least partially replace, said chat area and to present additional information to said user when actuated during, and as part of, said chat session:
wherein said context sensitive display is automatically actuated based on user click stream data when additional information is needed; and
wherein said context sensitive display provides relevant questions to the user, the user's answers to which provide said additional information to the agent to assist the agent in assisting the user.

9. The smart chat client of claim 8, further comprising:
an agent active button configured to provide an indication of chat area status.

10. A computer implemented chat method for a visitor browsing to a website, comprising:
providing a processor configured to display a chat area with which said visitor can be automatically connected to a chat queue, and into which said visitor can enter the visitor's side of a chat session and view an agent's side of said chat session; and
said processor configured to display automatically based upon context, or upon actuation by said agent, a multimedia chat widget to said visitor by using a sliding presentation of said chat widget, wherein said chat widget appears to slide from and at least partially replaces said chat area, and wherein visitor interaction with, and content of, said chat widget is independent of said chat area;
wherein said chat widget is automatically actuated based on visitor click stream data when additional information is needed;
wherein said chat widget provides relevant questions to the visitor, the visitor's answers to which provide said additional information to the agent to assist the agent in assisting the visitor;
wherein said chat area is configured to display a chat session history with which said visitor can track back all previous steps carried out with said chat session; and
wherein said chat session history comprising a history bar that provides an iconic representation of all previous visitor activities.

11. The method of claim 10, further comprising:
said processor configured to present said visitor with a choice to select between a chat session, a voice session, and a submit button within a pre-chat form displayed within said chat widget, said pre-chat form providing an area for entry of a visitor request.

12. The method of claim 11, further comprising:
said processor configured to display a pre-chat form icon in a history bar after said pre-chat form has been submitted by said visitor;

said processor configured to allow said visitor to view the submitted form by clicking the icon in the history bar.

13. The method of claim 10, further comprising:
said processor configured to generate and display to the visitor in said chat widget a list of top predictions regarding a visitor's request;
said processor configured to advance a session in response to said visitor selecting an entry in said list.

14. The method of claim 13, further comprising:
responsive to said visitor selecting an entry on said list, said processor configured to display a self service wizard in said chat widget.

15. The method of claim 14, further comprising:
a first part of said chat widget containing prerequisites which identify information that the visitor needs to have available to continue the chat session; and
a second part of the chat widget displaying steps to be followed by the visitor in connection with said visitor's request.

16. The method of claim 15, wherein the visitor submits the self service wizard and a self service icon display is displayed in the history bar.

17. The method of claim 14, further comprising:
said processor configured to display a resolution question to the visitor and, responsive to said visitor's entry, said processor configured to display a feedback request message and a submit button to the visitor;
wherein after the feedback form is submitted, a feedback form icon is displayed in the history icon.

18. A non-transitory storage medium containing program instructions which, when executed by a processor, implement a chat method for a visitor browsing to a website, comprising:
displaying a chat area with which said visitor can be automatically connected to a chat queue, and into which said visitor can enter the visitor's side of a chat session and view an agent's side of said chat session; and
displaying automatically based upon context, or upon actuation by said agent, a multimedia chat widget to said visitor by using a sliding presentation of said chat widget, wherein said chat widget appears to slide from said chat area, and wherein visitor interaction with, and content of, said chat widget is independent of said chat area;
wherein said chat widget is automatically actuated based on visitor click stream data when additional information is needed;
wherein said chat widget provides relevant questions to the visitor, the visitor's answers to which provide said additional information to the agent to assist the agent in assisting the visitor;
wherein said chat area is configured to display a chat session history with which said visitor can track back all previous steps carried out with said chat session; and
wherein said chat session history comprising a history bar that provides an iconic representation of all previous visitor activities.

* * * * *